US012700114B2

(12) United States Patent
Cassagne et al.

(10) Patent No.: US 12,700,114 B2
(45) Date of Patent: Aug. 4, 2026

(54) METHOD FOR CHARACTERISING A ZONE OF LAND INTENDED FOR THE INSTALLATION OF PHOTOVOLTAIC PANELS

(71) Applicant: TotalEnergies OneTech, Courbevoie (FR)

(72) Inventors: Valérick Cassagne, Limours (FR); Emmanuel Le Borgne, Chatillon (FR); Gilles Poulain, Antony (FR); Etienne Renault, Colombes (FR); David Benhaiem, Viroflay (FR)

(73) Assignee: TotalEnergies OneTech, Courbevoie (FR)

( * ) Notice: Subject to any disclaimer, the term of this patent is extended or adjusted under 35 U.S.C. 154(b) by 43 days.

(21) Appl. No.: 18/573,869

(22) PCT Filed: Jun. 23, 2022

(86) PCT No.: PCT/EP2022/067250
§ 371 (c)(1),
(2) Date: Dec. 22, 2023

(87) PCT Pub. No.: WO2022/268989
PCT Pub. Date: Dec. 29, 2022

(65) Prior Publication Data
US 2024/0289972 A1 Aug. 29, 2024

(30) Foreign Application Priority Data
Jun. 25, 2021 (FR) ........................................ 2106817

(51) Int. Cl.
*G06T 7/507* (2017.01)
*G06T 7/60* (2017.01)
*G06T 7/70* (2017.01)

(52) U.S. Cl.
CPC ................ *G06T 7/507* (2017.01); *G06T 7/60* (2013.01); *G06T 7/70* (2017.01);
(Continued)

(58) Field of Classification Search
CPC .......... G06Q 50/06; G01W 1/12; G01W 1/10; G06F 30/13; G06F 30/20; G06F 30/27;
(Continued)

(56) References Cited

U.S. PATENT DOCUMENTS

2008/0105045 A1* 5/2008 Woro ...................... G01W 1/12
73/170.27
2014/0032178 A1 1/2014 Kicinski et al.
(Continued)

FOREIGN PATENT DOCUMENTS

CN 102163341 A 8/2011

OTHER PUBLICATIONS

Rapport De Recherche Internationale issued in International Application No. PCT/EP2022/067250 dated Oct. 10, 2022.
(Continued)

*Primary Examiner* — Xiao M Wu
*Assistant Examiner* — Scott E Sonners
(74) *Attorney, Agent, or Firm* — Troutman Pepper Locke LLP

(57) ABSTRACT

The present invention relates to a method for characterizing a zone of land, referred to as the target zone, intended for the installation of photovoltaic panels, the method comprising:
receiving a bird's eye image of a target zone,
detecting, in the image, a shadow cast over the target zone originating from an obstacle,
determining a dimension, referred to as the main dimension, of the detected cast shadow,
determining the position of the sun during the acquisition of the image on the basis of characteristics relating to the image,
(Continued)

determining the height of the obstacle on the basis of the main dimension and the determined position of the sun, and characterizing the target zone on the basis of the height determined for the obstacle.

11 Claims, 5 Drawing Sheets

(52) U.S. Cl.
CPC .............. *G06T 2207/10016* (2013.01); *G06T 2207/10032* (2013.01); *G06T 2207/30184* (2013.01)

(58) Field of Classification Search
CPC ...... G06N 20/00; G06V 10/82; G06V 20/176; G06V 20/17; G06V 20/188; G06V 20/13; G06V 10/25; G06V 20/10; G06T 7/11; G06T 17/05; G06T 2207/10032; G06T 2207/20084; G06T 7/73; G06T 2207/10024; G06T 2207/20081; G06T 2207/30232; G06T 7/12; G06T 7/0004; G06T 7/0002; G06T 2207/30192; G06T 2207/30188; G06T 15/506; G06T 2207/30181

See application file for complete search history.

(56) References Cited

U.S. PATENT DOCUMENTS

| | | | | |
|---|---|---|---|---|
| 2015/0161442 A1* | 6/2015 | Sadka | .................... | G06Q 50/06 382/113 |
| 2018/0336408 A1* | 11/2018 | Arya | ........................ | F03D 17/00 |
| 2020/0098170 A1 | 3/2020 | Sehgal et al. | | |
| 2021/0026377 A1 | 1/2021 | Huang et al. | | |
| 2024/0331375 A1* | 10/2024 | Kanaujia | ................ | G06V 10/82 |

OTHER PUBLICATIONS

Rapport De Recherche Préliminaire issued in French Patent Application No. 2106817 dated Mar. 11, 2022.

First Search dated Apr. 13, 2026, from corresponding Chinese application No. 202280045352.1.

First Office Action dated Apr. 13, 2026, from corresponding Chinese application No. 202280045352.1.

* cited by examiner

METHOD FOR CHARACTERISING A ZONE OF LAND INTENDED FOR THE INSTALLATION OF PHOTOVOLTAIC PANELS

CROSS REFERENCE TO RELATED APPLICATIONS

The present application is a U.S. National Phase Application under 35 U.S.C. § 371 of International Patent Application No. PCT/EP2022/067250 filed Jun. 23, 2022, which claims priority of French Patent Application No. 21 06817 filed Jun. 25, 2021. The entire contents of which are hereby incorporated by reference.

FIELD OF THE INVENTION

The present invention relates to a method for characterizing a zone of land, intended for the installation of photovoltaic panels. The invention further relates to an associated computer program.

BACKGROUND

The production of electricity from renewable energies is a challenge for our societies. To this end, dedicated installations have been developed, including photovoltaic panels which are used for producing electricity from solar energy. Photovoltaic panels are conventionally installed on the roofs of buildings, for maximizing the energy recovered at the consumption site.

To optimize the deployment of photovoltaic panels, tools have been developed for estimating the solar production of a future installation, and thereby for evaluating the profitability thereof.

Nevertheless, such tools generally do not take into account the impact of obstacles shading the zone concerned or take into account the obstacles by estimating the dimension thereof empirically, or require information which is not immediately available. Thereby, the accuracy of the use of such tools can be further improved.

There is thus a need for a tool for helping an operator to characterize more precisely a zone of land intended for the installation of photovoltaic panels.

SUMMARY

To this end, the subject matter of the present description is a method for characterizing a zone of land, called a target zone, intended for the installation of photovoltaic panels, the target zone receiving direct solar radiation and extending over several meters in length and several meters in width, at least part of the target zone being shaded over time by at least one obstacle, the method being implemented by computer and comprising the following steps:
- a. the reception of a bird's eye view image of land comprising at least one target zone,
- b. the detection, on the image, of a shadow cast on the target zone, the shadow cast coming from an obstacle,
- c. the determination of a dimension, called the main dimension, of the detected cast shadow, the main dimension corresponding to the height of the obstacle,
- d. the determination of the position of the sun when acquiring the image on the basis of characteristics relating to the image,

- e. the determination of the height of the obstacle on the basis of the main dimension determined for the shadow cast and the determined position of the sun, and
- f. the characterization of the target zone on the basis of the height determined for the obstacle.

According to other particular embodiments, the method comprises one or more of the following features, taken individually or according to all technically possible combinations:
- the characterization step comprises the determination, for time steps taken over a predetermined period, of the parts of the target zone shaded by the obstacle, on the basis of the height of the obstacle and of the positions of the sun for each time step of the predetermined period;
- the characterization step comprises the evaluation of the impact of the obstacle on at least one datum relating to the solar energy received on the target zone over a predetermined period of time, on the basis of the height determined for the obstacle and of the positions of the sun over the predetermined period of time;
- the characteristics of the image used in the step of determining the position of the sun comprise only the date of acquisition of the image, the geographical coordinates of a point in the image and a geometric characteristic of the cast shadow in question;
- the geometric characteristic of the cast shadow depends on the extent of the cast shadow, on the orientation of the obstacle and on the orientation of the surface onto which the cast shadow is projected;
- the step of determining the position of the sun comprises the determination of the azimuth of the sun on the basis of the geometric characteristic of the cast shadow, and the determination of the elevation of the sun corresponding to the determined azimuth, the determination of the elevation being preferentially obtained via a database listing the positions of the sun at the date of acquisition of the image or by an astronomical calculation;
- the step of detecting the cast shadow is implemented by a detection model, the detection model having been previously trained on a database comprising bird's eye images of cast shadows, the detection model being e.g. a neural network;
- the step of detecting the cast shadow comprises processing the received image by enhancing the contrast of the image;
- the method comprises a step of optimizing the positioning of photovoltaic modules on the target zone according to the characterization of the target zone.

The present description further relates to a computer program product comprising program instructions stored on a computer-readable storage medium, for the execution of a method as described above when the computer program is executed on a computer.

The present description further relates to a readable information medium on which is stored a computer program product such as described hereinabove.

BRIEF DESCRIPTION OF THE DRAWINGS

Other features and advantages of the invention will appear upon reading hereinafter the description of the embodiments of the invention, given only as an example, and making reference to the following drawings.

DETAILED DESCRIPTION

Figure 1:
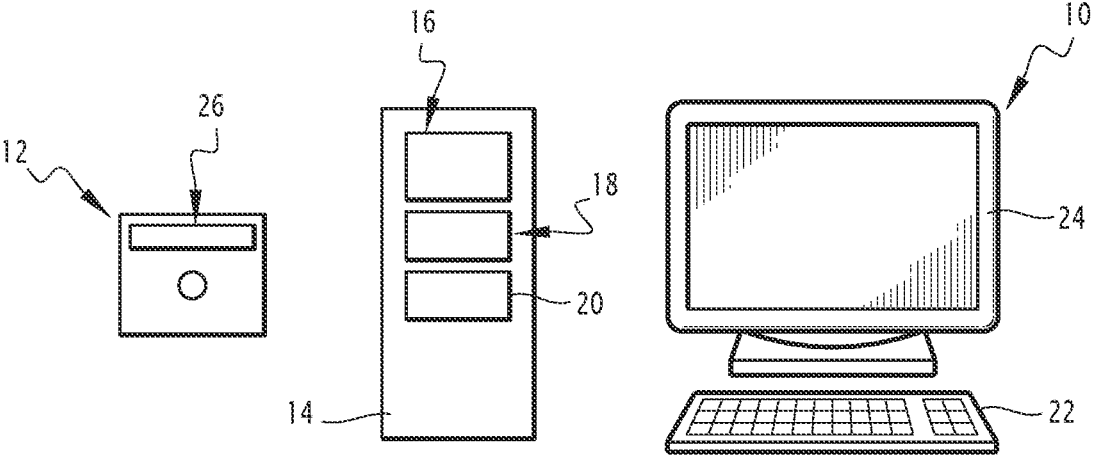
FIG. 1 is a schematic view of an example of a computer used for the implementation of a method for characterizing a zone of land intended for the installation of photovoltaic panels.

A calculator 10 and a computer program product 12 are shown in FIG. 1.

The calculator 10 is preferentially a computer.

More generally, the calculator 10 is an electronic calculator suitable for handling and/or transforming data represented as electronic or physical quantities in registers of the calculator 10 and/or memories into other similar data corresponding to physical data in memories, registers or other types of display, transmission or storage.

The calculator 10 interacts with the computer program product 12.

As shown in FIG. 1, the calculator 10 includes a processor 14 comprising a data processing unit 16, memories 18 and a data storage medium 20. In the example illustrated in FIG. 1, the calculator 10 comprises a keyboard 22 and a display unit 24.

The computer program product 12 includes a storage medium 26.

The storage medium 26 is a medium readable by the calculator 10, usually by the data processing unit 16. The readable storage medium 26 is a medium suitable for storing electronic instructions and apt to be coupled to a bus of a computer system.

As an example, the storage medium 26 is a diskette or a floppy disk, an optical disk, a CD-ROM, a magneto-optical disk, a ROM, a RAM, an EPROM, an EEPROM, a magnetic card or an optical card.

The computer program 12 containing program instructions is stored on the storage medium 26.

The computer program 12 can be loaded into the data processing unit 16 and is suitable for leading to the implementation of a method for characterizing a zone of land intended for the installation of photovoltaic panels, when the computer program 12 is implemented on the processing unit 16 of the calculator 10.

Figure 2:
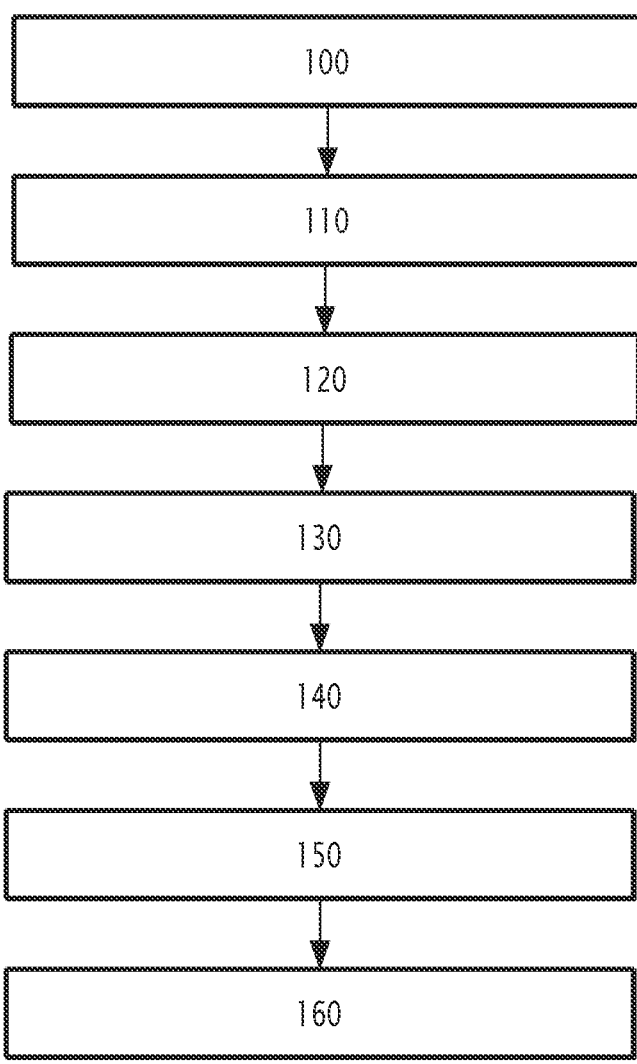
FIG. 2, a flowchart of an example of implementation of a method for characterizing a zone of land intended for the installation of photovoltaic panels.

The operation of the calculator 10 will now be described with reference to FIG. 2 which schematically illustrates an example of the implementation of a method for characterizing a zone of land intended for the installation of photovoltaic panels, and to FIGS. 3 to 5 which are examples for illustrating certain steps of the method.

The method aims to characterize a zone of land, called the target zone $Z_C$, intended for the installation of photovoltaic panels. In other terms, a target zone $Z_C$ has dimensions and a shape making possible the installation of one or a plurality of photovoltaic panels on the zone, the modules forming one or a plurality of photovoltaic panels. A photovoltaic panel consists of at least two photovoltaic modules. Typically, the target zone $Z_C$ extends over several meters in length and several meters in width.

A target zone $Z_C$ is a zone of an open-air land, i.e. receiving direct solar radiation.

A target zone $Z_C$ is e.g. a surface of a building (roof, terrace), an outdoor parking lot, a body of water, or any other free surface on the ground.

At least a part of the target zone $Z_C$ is shaded over time (i.e. depending on the position of the sun in the sky) by at least one obstacle O. The obstacle O is thus suitable for casting a shadow OP of variable extent over the target zone $Z_C$ depending on the position of the sun in the sky. The obstacle O does not cast any shadow on the target zone $Z_C$ in the absence of an external radiation source.

In such case, a cast shadow refers to the shadow of an object (in the present case, the obstacle O) projected onto a surface (in the present case, the target zone $Z_C$). A cast shadow has a dimension, called main dimension L, corresponding to the vertical extent of the obstacle O considered. Such a main dimension L thus depends on the height of the obstacle O considered and on the position of the sun in the sky.

The obstacle O is e.g. an element the largest dimension of which extends along the vertical or horizontal direction. The obstacle O is e.g. a building, an object on a roof (e.g. a chimney, an edicule, ventilation or piping elements), vegetation (e.g. tree), a pole, a cable, an antenna or a silo.

The characterization method comprises a step 100 of reception of an eye bird's image IM of a land comprising at least one target zone $Z_C$. The step 100 is implemented by the calculator 10 in interaction with the computer program product 12, i.e. is implemented by computer.

The term "eye bird's view" means that the image IM was taken from a high point of view making possible e.g. to image the roofs of buildings.

The image IM was acquired e.g. by a satellite system. In a variant, the image IM was acquired by an acquisition system (camera) mounted on an aircraft.

The image IM is typically a calibrated image, i.e. the scale relations between the dimensions of the image IM and the dimensions of the represented site are known.

Preferentially, the image IM is typically a geo-referenced image, i.e. each pixel of the image IM is associated with a latitude and a longitude.

Preferentially, the image IM is a two-dimensional image. Advantageously, the image IM is a color image.

Figure 3:
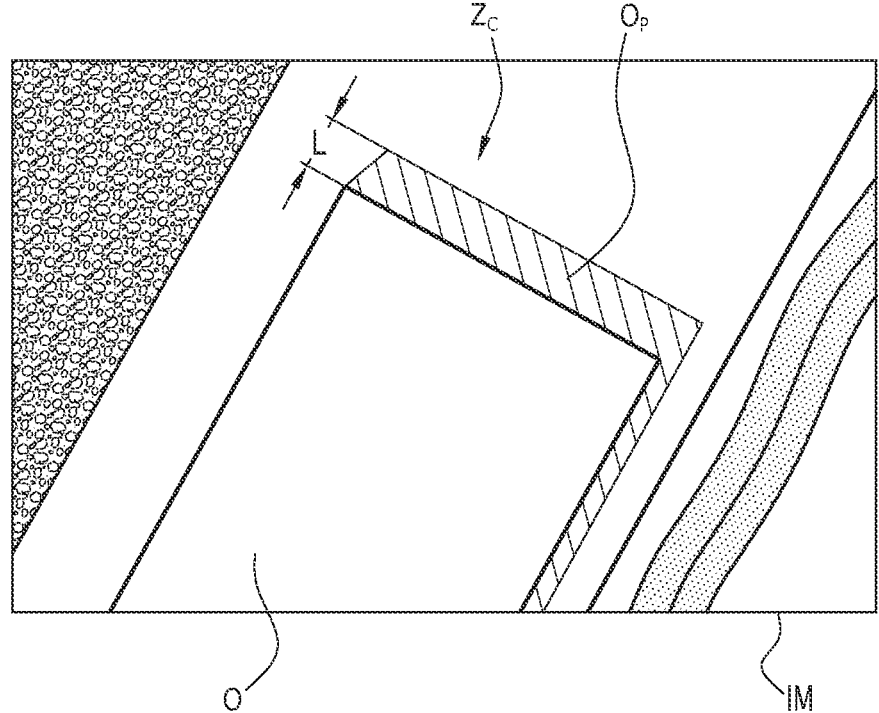
FIG. 3 is a schematic representation of an example of a zone (roof) of land comprising an obstacle casting a shadow over the zone.

FIG. 3 illustrates an example of an image IM of a target zone $Z_C$ (roof) on which an obstacle O (building on the roof) is present. The building is at the origin of a cast shadow OP on the roof.

The determination method comprises a step 110 of detecting, on the image IM, a shadow cast $O_P$ on the target zone $Z_C$, the cast shadow $O_P$ coming from an obstacle O. Step 110 is implemented by the computer 10 in interaction with the computer program product 12, i.e. is implemented by computer.

At the end of the detection, at least two extreme points of the cast shadow $O_P$ can be identified. In one example, the contours of the cast shadow $O_P$ can also be identified. In the example illustrated by FIGS. 3 and 4, the cast shadow $O_P$ is identified using hatching.

In an example of implementation, the detection of the cast shadow $O_P$ is implemented by a detection model. The detection model was previously trained on a database comprising bird's eye images of cast shadows.

In an example of implementation, the training of the detection model is carried out according to a learning method applied to the database.

The detection model is e.g. a neural network. The learning method model is used for configuring the neural network as the learning thereof progresses on the database. In one example, a part of the database is used for configuring the neural network and the other part for validating the configuration.

In one example, the detection model is based on the YOLO (You Only Look Once) algorithm. In addition or in a variant, the detection of the cast shadow $O_P$ is performed following a processing of the image IM. The processing aims e.g. to accentuate the contrast of the image IM. Indeed, such processing brings out the shadows, which are darker than the other elements of the image IM. In another example, the processing consists of comparing the image IM with another image of the same target zone $Z_c$ that is not shaded or with a different shading (due to a different position of the sun in the sky).

In yet another example, the cast shadow $O_P$ is detected following the acquisition, by an operator, of extreme points of the cast shadow $O_P$.

The determination method comprises a step 120 of determining the main dimension L of the detected cast shadow $O_P$ representative of the height of the obstacle O. Step 120 is implemented by the computer 10 interacting with the computer program product 12, i.e. is implemented by computer.

The main dimension L of the cast shadow $O_P$ is e.g. determined by measuring the distance between the extreme points between which the shadow extends. The distance between the extreme points is e.g. obtained directly from the image IM which is calibrated or even geo-referenced.

The determination method comprises a step 130 of determining the position of the sun during the acquisition of the image IM on the basis of characteristics relating to the image IM. The step 130 is implemented by the calculator 10 in interaction with the computer program product 12, i.e. is implemented by computer.

The position of the sun is typically expressed in terms of azimuth $a_z$ and elevation E. The azimuth $a_z$ of the sun is the angle, in the horizontal plane, between the direction of the sun and a reference direction, herein the north direction. The ε elevation of the sun is the angular height of the sun in the sky, measured from the horizontal. The elevation ε is 0° at sunrise and 90° when the sun is directly above, the zenith (which occurs e.g. at the equator during spring and autumn equinoxes).

In one embodiment, the characteristics of the image IM used in the step of determining the position of the sun comprise only the date (day, month and year) of acquisition of the image IM, the geographical coordinates of a point of the image IM and a geometric characteristic of the cast shadow $O_P$ considered. Thereby, in such embodiment, the instant of acquisition of the image IM (time of day) is not a datum which is used. Such embodiment is thus of particular interest when the instant of acquisition of the image IM is unknown.

The date of acquisition of the image IM is typically a metadatum provided with the image IM. Similarly, the geographical coordinates of a point in the image IM are typically provided with the image IM or are directly extracted from the image IM insofar as the image IM is a calibrated or even geo-referenced image. In the latter case, the point considered in the image IM is e.g. a point of the obstacle O.

The geometric characteristic of the image IM considered depends on the extent of the cast shadow $O_P$ (corresponding to the vertical extent of the obstacle O considered), the orientation of the obstacle O and the orientation of the surface on which the cast shadow $O_P$ is projected.

For example, when the projection surface is horizontal (or considered horizontal) and the obstacle O extends along a vertical direction, the geometric characteristic of the image IM considered is the angle α between a direction pointing towards the north and a direction parallel to the extent of the detected cast shadow $O_P$.

Figure 4:
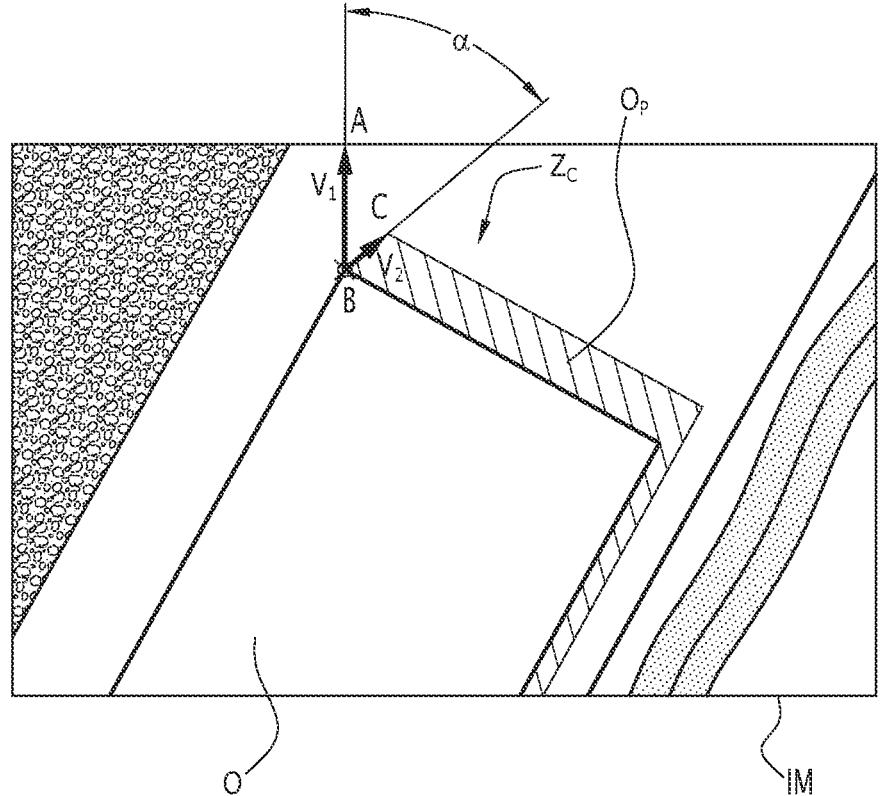
FIG. 4 is a simplified schematic representation of a geometric characteristic (angle of the cast shadow shown in FIG. 3, FIG. 5 is a schematic representation illustrating the geometric relations between the elevation of the sun, the height of the obstacle and the main dimension of the cast shadow coming from the obstacle.
Figure 5:
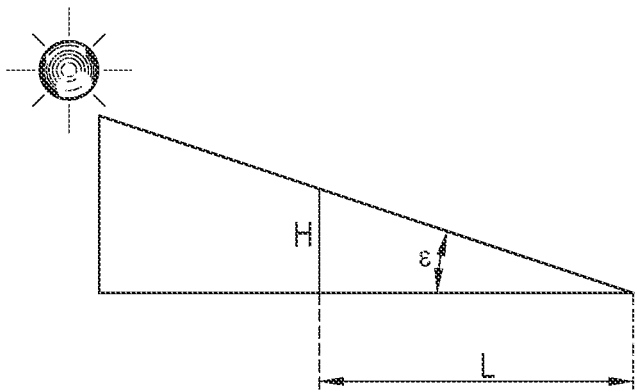

Such an angle α is shown in FIG. 4. In particular, in said figure, the points B and C refer to extreme points reflecting the extent of the cast shadow $O_P$. Point A has been positioned so that the direction passing through points A and B is along the north direction. From such points, a first vector V1 passing through points A and B and a second vector V2 passing through points B and C, are defined The angle α is e.g. obtained using the following formula:

$$\alpha = atan2(V2.y, V2.x) - atan2(V1.y, V1.x)$$

Where:
atan2(x, y) is the angle in radians between the positive part of the abscissa axis X of a plane and the point of coordinates (x, y),
V2.y refers to the projection of the second vector V2 on the ordinate axis Y (vertical axis),
V2.x refers to the projection of the second vector V2 on the abscissa axis X (horizontal axis),
V1.y refers to the projection of the first vector V1 on the ordinate axis Y (vertical axis), and
V1.x refers to the projection of the first vector V1 on the abscissa axis X (horizontal axis).

In such embodiment, the step 130 of determining the position of the sun comprises the determination of the azimuth $a_z$ of the sun on the basis of the geometric characteristic of the cast shadow $O_P$. The azimuth $a_z$ of the sun is obtained as a function of the angle α obtained for the cast shadow $O_P$, and, if appropriate, of the orientation of the obstacle O and of the orientation of the surface onto which the cast shadow $O_P$ is projected.

For example, when the projection surface is horizontal (or considered horizontal) and the obstacle O extends along a vertical direction, the azimuth $a_z$ is equal to the angle α determined for the cast shadow $O_P$ in degrees, to which 180° is added.

Once the azimuth $a_z$ of the sun has been determined, the step 130 of determining the position of the sun comprises the determination, in a database listing positions of the sun at the date of acquisition of the image IM, of an instant of the day corresponding to the azimuth $a_z$ determined. The elevation & of the sun, corresponding to said instant, is then determined.

In a variant, the time of day and/or the elevation is directly obtained via an astronomical calculation. As an example, the document by Reda, I.; Andreas, A. (2003). Solar Position Algorithm for Solar Radiation Applications. 55 pp.; NREL Report No. TP-560-34302, Revised January 2008 describes calculations used for determining the position of the sun on the basis of the date, the time and the location on Earth.

In a variant, the elevation ε of the sun is determined directly in the database or by astronomical calculation on the basis of the determined azimuth $a_z$ of the sun.

In another embodiment, the characteristics of the image IM used in the step of determining the position of the sun comprise the date of acquisition of the image IM, the geographical coordinates of a point of the image IM and an instant of acquisition of the image IM. Such data are used for finding directly in the database or by an astronomical calculation, the azimuth $a_z$ and the elevation & of the sun at the place, at the date and at the moment of acquisition of the image IM.

The characterization method comprises a step 140 of determining the height H of the obstacle O on the basis of the main dimension L determined for the cast shadow $O_P$ and of the determined position of the sun. The height H of the obstacle O is the dimension of the obstacle O along the vertical. The step 140 is implemented by the calculator 10 in interaction with the computer program product 12, i.e. is implemented by computer.

Optionally, the orientation of the obstacle O and the orientation of the surface onto which the shadow $O_P$ is projected are also taken into account for determining the height H of the obstacle O.

For example, when the projection surface is horizontal (or considered horizontal) and the obstacle O extends along a vertical direction, the height H of the obstacle O is related to the elevation ε of the sun and to the main dimension L of the cast shadow $O_P$, by a geometric relation which is as follows (see also FIG. 5):

$$H = \tan(\varepsilon).L$$

The characterization method comprises a step 150 of characterizing the target zone $Z_C$ as a function of the height H determined for the obstacle O. At the end of step 150, characteristics of the target zone $Z_C$ are obtained, taking into account the obstacle O.

In one example, the characteristics of the target zone $Z_C$ are also determined on the basis of positions of the sun over a predetermined period and for different time steps. The predefined period of time is e.g. equal to 1 year. The time steps have e.g. of a length of time of 1 hour.

In an example of implementation, the characterization step 150 comprises the evaluation, for time steps taken over a predetermined period of time, of parts of the target zone $Z_C$ shaded by the obstacle O. For example, the surfaces of the shaded parts over time, are determined. For this purpose, a three-dimensional model of the obstacle O is first determined on the basis of the determined height H and the footprint of the obstacle O. The footprint is the vertical projection of the obstacle O onto the target zone $Z_C$. It is the three-dimensional model that is then projected onto the target zone $Z_C$ according to different positions of the sun in the sky over the predetermined period of time.

In addition or as a variant, the characterization step 150 comprises the evaluation of the impact of the obstacle O on at least one datum relating to the solar energy received on the target zone $Z_C$ over a predetermined period, on the basis of the height H determined for the obstacle O and of the positions of the sun over the predetermined period of time. For this purpose, the previous three-dimensional model is e.g. first determined. The datum relating to solar energy is e.g. the amount of solar energy actually received on the target zone $Z_C$ (taking into account the shadows cast by the obstacle O) over the predetermined period of time. Thereby, it is in this way possible to compare the solar energy datum for the different parts of the target zone $Z_C$.

The characterization method comprises a step 160 of optimizing the positioning of photovoltaic modules on the target zone $Z_C$ on the basis of the characterization carried out of the target zone $Z_C$.

For example, the installation of photovoltaic modules is carried out on the parts of the target zone $Z_C$ for which a solar datum is greater than a predetermined threshold, which makes it possible to optimize the profitability of the installation. The solar datum is e.g. the solar energy received on the target zone $Z_C$ over a predetermined period of time.

Thereby, the present method can be used for a more precise characterization of zones of an environment intended for the installation of photovoltaic panels. More particularly, the method can be used for the determination of the height H of obstacles O on two-dimensional images, which leads to a better evaluation of the shaded parts of the target zone $Z_C$ over time. The above leads e.g. to a better evaluation of the amount of solar energy received on the target zone $Z_C$ over a predetermined period of time, and thereby a better estimation of the performance and profitability of the installation.

A person skilled in the art will understand that the embodiments and variants described above can be combined so as to form new embodiments provided that same are technically compatible.

The invention claimed is:

1. A method for characterizing a zone of a land, called a target zone, intended for installation of photovoltaic panels, the target zone receiving direct solar radiation and extending over at least two meters in length and at least two meters in width, at least part of the target zone being shaded over time by at least one obstacle, the method being implemented by computer and comprising the following steps:
   a. receiving a bird's eye view image of a land comprising at least one target zone,
   b. detecting, on the image, a shadow cast onto the target zone, the cast shadow coming from an obstacle,
   c. determining a dimension, called the main dimension, of the detected cast shadow, the main dimension corresponding to a height of the obstacle,
   d. determining a position of the sun when acquiring the image on the basis of characteristics relating to the image,
   e. determining the height of the obstacle on the basis of the main dimension determined for the shadow cast and the determined position of the sun, and
   f. characterizing the target zone on the basis of the height determined for the obstacle,
   wherein the characteristics of the image used in the step of determining the position of the sun comprise only the date of acquisition of the image, the geographical coordinates of a point of the image and a geometric characteristic of the cast shadow considered.

2. The method according to claim 1, wherein the characterization step comprises determining, for time steps taken over a predetermined period of time, the parts of the target zone shaded by the obstacle, on the basis of the height of the obstacle and of the position of the sun for each time step of the predetermined period of time.

3. The method according to claim 1, wherein the characterization step comprises evaluating an impact of the obstacle on at least one datum relating to the received solar energy on the target zone over a predetermined period of time, on the basis of the height determined for the obstacle and of the position of the sun over the predetermined period of time.

4. The method according to claim 1, wherein the geometric characteristic of the cast shadow depends on the extent of the cast shadow, the orientation of the obstacle and the orientation of the surface onto which the cast shadow is projected.

5. The method according to claim 1, wherein the step of determining the position of the sun comprises determining an azimuth of the sun on the basis of the geometric characteristic of the cast shadow, and determining an elevation of the sun corresponding to the azimuth determined.

6. The method according to claim 5, wherein the determination of the elevation is obtained via a database listing the positions of the sun at the date of acquisition of the image or by an astronomical calculation.

7. The method according to claim 1, wherein the step of detecting the cast shadow is implemented by a detection model, the detection model having been previously trained on a database comprising bird's eye images of cast shadows.

8. The method according to claim 7, wherein the detection model is a neural network.

9. The method according to claim 1, wherein the step of detecting the cast shadow comprises processing the received image by enhancing the contrast of the image.

10. The method according to claim 1, wherein the method comprises optimizing a positioning of photovoltaic modules on the target zone on the basis of the characterization carried out of the target zone.

11. A non-transitory computer readable storage medium comprising, a computer program having computer software instructions configured to cause a computer to perform the method according to claim 1.

\*   \*   \*   \*   \*